(12) United States Patent
Oana

(10) Patent No.: US 7,140,660 B2
(45) Date of Patent: Nov. 28, 2006

(54) CUP HOLDER ASSEMBLY

(75) Inventor: Adrian Oana, Windsor (CA)

(73) Assignee: General Motors Corporation, Detroit, MI (US)

( * ) Notice: Subject to any disclaimer, the term of this patent is extended or adjusted under 35 U.S.C. 154(b) by 147 days.

(21) Appl. No.: 10/925,758

(22) Filed: Aug. 25, 2004

(65) Prior Publication Data

US 2006/0043752 A1  Mar. 2, 2006

(51) Int. Cl.
  *B60R 7/06*  (2006.01)
(52) U.S. Cl. .................. 296/37.8; 224/926; 248/311.2; 297/188.17
(58) Field of Classification Search ............... 296/37.8, 296/37.12; 224/926, 483; 248/311.2; 297/188.15, 297/188.16, 188.17, 188.19
  See application file for complete search history.

(56) References Cited

U.S. PATENT DOCUMENTS

| | | | |
|---|---|---|---|
| 4,953,771 A * | 9/1990 | Fischer et al. .............. | 224/549 |
| 5,289,962 A | 3/1994 | Tull et al. .................... | 224/549 |
| 5,524,958 A | 6/1996 | Wieczorek et al. .... | 297/188.17 |
| 5,618,018 A | 4/1997 | Baniak ..................... | 248/311.2 |
| 5,673,891 A * | 10/1997 | Fujihara et al. .......... | 248/311.2 |
| 5,857,633 A * | 1/1999 | Pelchat et al. ........... | 248/311.2 |

FOREIGN PATENT DOCUMENTS

JP  05213106 A  *  8/1993

\* cited by examiner

*Primary Examiner*—Joseph D. Pape
(74) *Attorney, Agent, or Firm*—Laura C. Hargitt

(57) ABSTRACT

A cup holder assembly includes a housing partially defined by a pair of opposing sidewalls and configured to partially enclose an interior space. At least one support ring pivotably moves along a cam surface of the housing between a use position and a stored position. In the use position, the support ring is substantially outside of the interior space, is perpendicular to the opposing side walls, and can at least partially support a container. In the stored position, the support ring is substantially inside of the interior space parallel and substantially adjacent to the one of the side walls.

15 Claims, 3 Drawing Sheets

US 7,140,660 B2

CUP HOLDER ASSEMBLY

TECHNICAL FIELD

This invention relates to a cup holder assembly for a vehicle including a pivotable support ring.

BACKGROUND OF THE INVENTION

Space constraints on vehicles typically drive the offering and/or location of cup holders. For instance, cup holders may be deployed in a rearward location for use by occupants of a rear seat. However, if such cup holders are mounted to the floor console, they typically are provided in lieu of a storage bin in the console. If a rear storage bin is provided on the floor console, molded fixed cup holders may be attached rearward of the rear bin to the console. However, this arrangement may compromise the leg room of rear passengers.

SUMMARY OF THE INVENTION

The invention provides a cup holder assembly that includes a housing at least partially defined by a pair of opposing side walls and configured to at least partially enclose an interior space. The housing includes a cam surface. At least one support ring is pivotably movable between a use position and a stored position. In the use position, the support ring is positioned substantially outside of the interior space and is perpendicular to the opposing side walls so that it is operable for at least partially supporting a container. In the stored position, the support ring is positioned substantially inside of the interior space substantially parallel to and substantially adjacent to one of the side walls. The support ring contacts the housing along the cam surface to pivot between the positions.

In one aspect of the invention, a first support ring is substantially adjacent to one of the side walls and a second support ring is substantially adjacent to the other of the side walls when the rings are in the stored position. Furthermore, a storage bin further defines the interior space and is recessed between the first and second support rings when the support rings are in the stored position so that the first and second support rings are stored between the bin and the respective side walls. Preferably, the housing is a floor console for a vehicle and the cover is movable rearward of the console to provide accessibility to the support ring from a rearward location in the vehicle. Accordingly, the invention permits extremely compact packaging of the support rings between the recessed storage bin and the side walls, a space that is typically unused on current vehicles. Thus, support rings and a storage bin are provided without requiring added storage space or an extension of the console.

In still another aspect of the invention, at least one rail is slideably connected with respect to the housing and cooperates with the support ring to further support the container. A cover is connected to the rail and cooperates with the opposing side walls to further enclose the interior space. The support ring is pivotably connected between the rail and the cover and the cover is movable toward and away from the housing from moving the support ring between the stored position and the use position, respectively.

In yet another aspect of the invention, a locking element is operable for locking the support ring in the use position when the cover is moved away from the housing and unlocking the support ring as the cover is moved toward the housing to permit pivoting of the support ring to the support position.

In still another aspect of the invention, a spring is connected between the cover and the support ring biases the support ring toward the use position and toward the locking element.

In accordance with another aspect of the invention, a cup holder assembly includes a housing characterized by a side wall and another wall (e.g., a rearwardly-facing wall) spaced apart from the side wall to define a crevice therebetween. The rearwardly-facing wall is characterized by a cam surface. A cover is movable toward and away from the housing. A rail is connected with respect to the cover and slideable within the crevice as the cover is moved toward and away from the housing. A pivotable circumferential support element (also referred to herein as a ring or support ring) is connected between the cover and automatically pivots along the cam surface between a use position and a stored position as the cover is moved toward the housing, and vice versa as the cover is moved away from the housing. In the use position, the pivotable circumferential support element is configured and operable for at least partially supporting a container. In the stored position, the circumferential support element is disposed within the crevice.

In another aspect of the invention, the housing is configured to receive a power outlet. The cover is cooperatively configured to permit access to the power outlet form a rearward location in the vehicle.

In still another aspect of the invention, a portion of the housing forms a storage bin. The crevice is further defined by the storage bin. Thus, the circumferential support element is stored between the storage bin and the side wall when it is in the stored position.

In yet another aspect of the invention, the console defines a cavity adapted for at least partially containing a parking brake mechanism.

Thus, the invention provides a floor console that at least partially contains a parking brake mechanism and a storage bin and houses a cup holder assembly deployable for rear passenger use without extending the size of the console and utilizing only existing space within the console for storage of the support rings when not in use.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
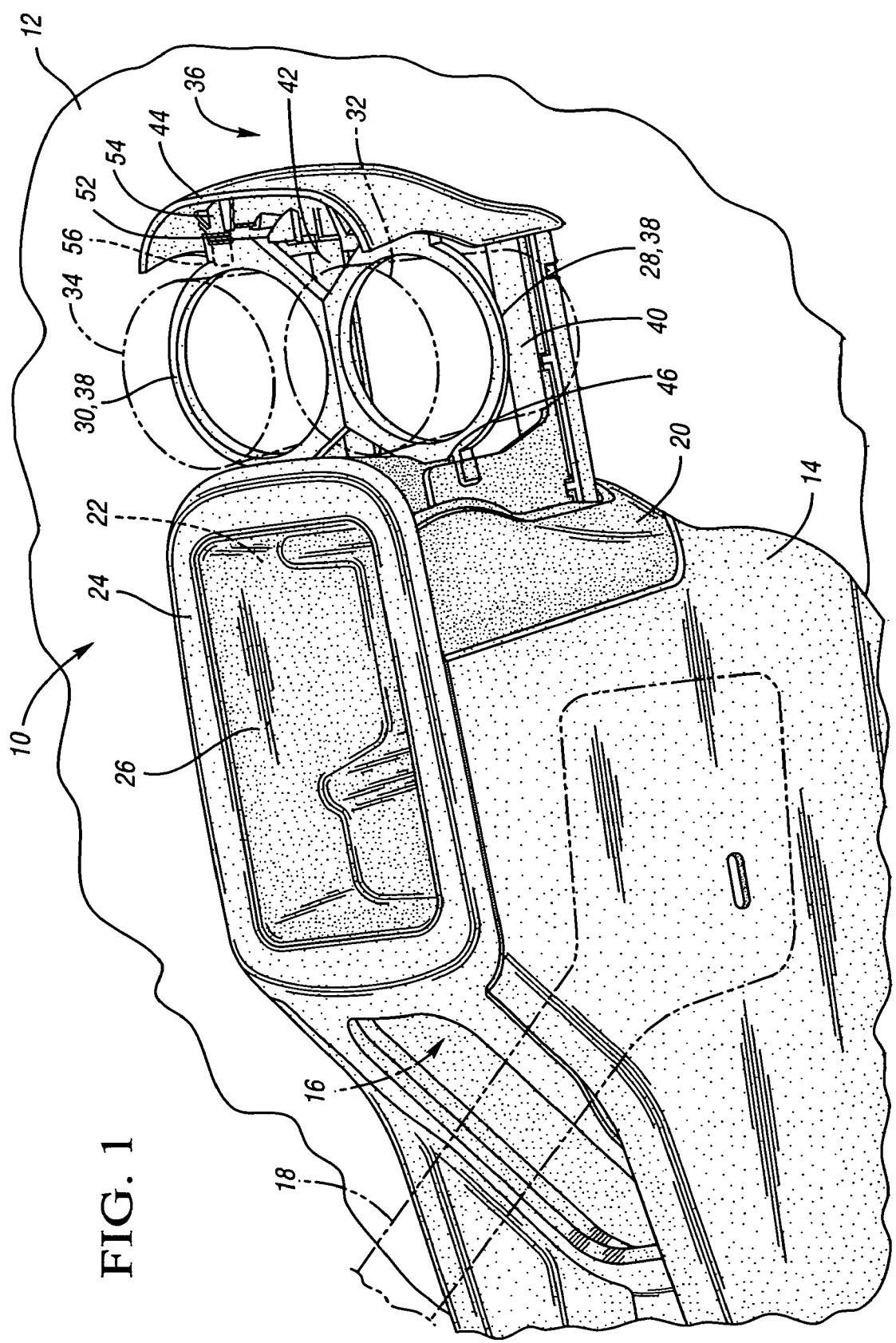
FIG. 1 is a schematic perspective illustration of a cup holder assembly connected to a floor console of a vehicle, the cup holder assembly including beverage container support rings shown in a use position.

Referring to the drawings, wherein like reference numerals refer to like components, FIG. 1 shows a cup holder assembly 10 mounted in a vehicle 12. The cup holder assembly 12 includes a housing 14. In this embodiment, the housing 14 is a floor console. The housing 14 defines an interior space 16, also referred to as a cavity, which may be utilized to at least partially contain a parking brake mechanism 18. A pair of opposing side walls, a left side wall 20 and a right side wall 22 (right side wall 22 better shown in FIG. 2A) are integrally formed with or connected to the housing 14. The housing 14 is configured to receive or may integrally form a storage bin 24. The storage bin 24 is formed with a recess 26 which recedes downward between the side walls 20, 22 and further defines the interior space 16.

The cup holder assembly 10 includes first and second support rings 28, 30, respectively, also referred to as circumferential support elements. The support rings 28, 30 are configured to provide circumferential support to first and second beverage containers 32, 34, respectively, such that the beverage containers 32, 34 are accessible in a rearward location 36 of the vehicle 12. Within the scope of the invention, the support rings 28, 30 need not have the substantially circular shape shown in FIG. 1; they may have any shape that allows them to be utilized for providing circumferential support to a container. The support rings 28, 30 are shown in a use position 38 in which they are substantially outside of the interior space 16. In the use position 38, the support rings 28, 30 are substantially perpendicular to the side walls 20, 22.

The cup holder assembly 10 further includes first and second rails 40, 42, respectively. The rails 40, 42 are slideably connected with respect to the housing 14. The rails 40, 42 further support the respective beverage containers 32, 34 from below. Accordingly, the rails 40, 42 cooperate with the first and second support rings 28, 30 to stably support the beverage containers 32, 34.

A cover 44 is connected to the rails 40, 42 and is movable toward and away from the housing 14 via the rails 40, 42. The cover 44 opens (i.e., slides away from the housing 14) rearward of the housing 14 in the vehicle 12 to provide access to the support rings 28, 30 from the rearward location 36.

Figure 2A:
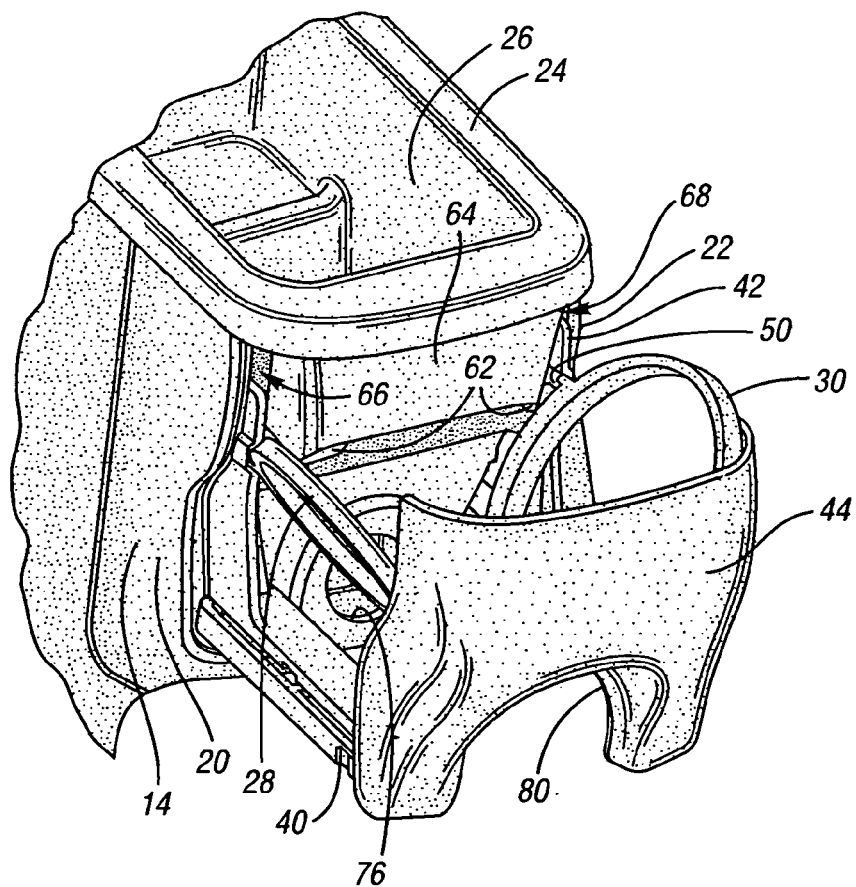
FIG. 2A is a schematic perspective illustration in rotated fragmentary view of the cup holder assembly of FIG. 1 with the support rings partially pivoted toward a stored position.

The first rail 40 forms a first locking element 46 which cooperates with a notch 48 (better viewed in FIG. 2B) formed in the first support ring 28 to lock or stop the first support ring 28 in the use position 38. Referring to FIG. 2A, a like second locking element 50 is formed by the second rail 42 and similarly cooperates with a notch (not shown) formed in the second support ring 30 to lock or stop the second support ring 30 in the use position 38 shown in FIG. 1.

Referring to FIG. 1, a spring 52 is disposed about an extension 54 formed by the cover 44. The extension 54 is received within a recess 56 formed in the second support ring 30 to pivotably connect the second support ring 30 to the cover 44. (A like spring, extension, and recess are formed and disposed between the first support ring 28 and the cover 44 in a mirror image of those shown with respect to the second support ring 30.)

Figure 3:
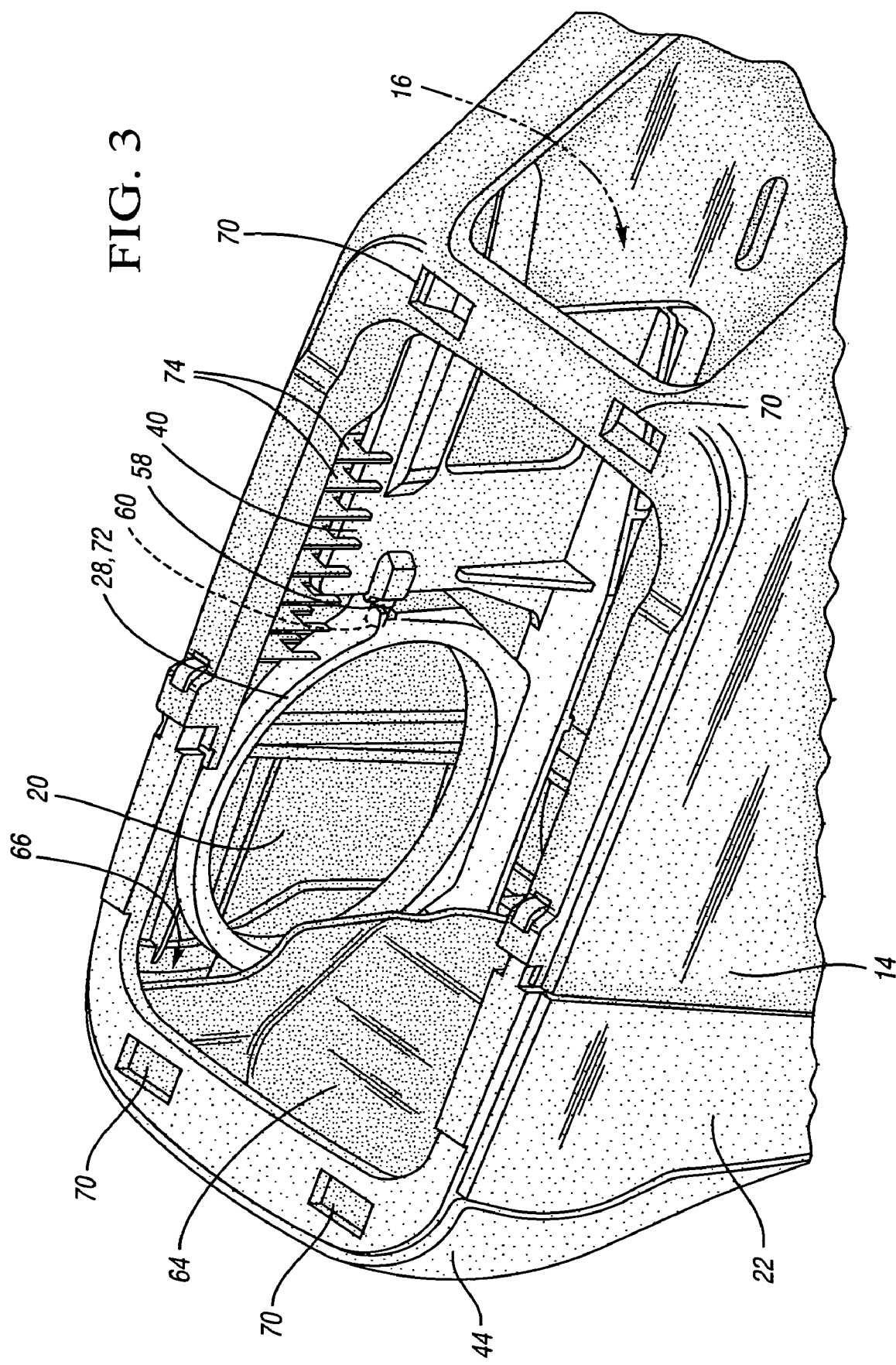
FIG. 3 is a schematic perspective illustration in rotated fragmentary view of the cup holder assembly of FIG. 1 showing one of the support rings in a stored position.

Referring now to FIG. 3, it may be seen that the first support ring 28 is pivotably connected to the first rail 40 via a rail extension or journal portion 58 which is received within a rail extension recess 60 formed in the first ring 28.

Figure 2B:
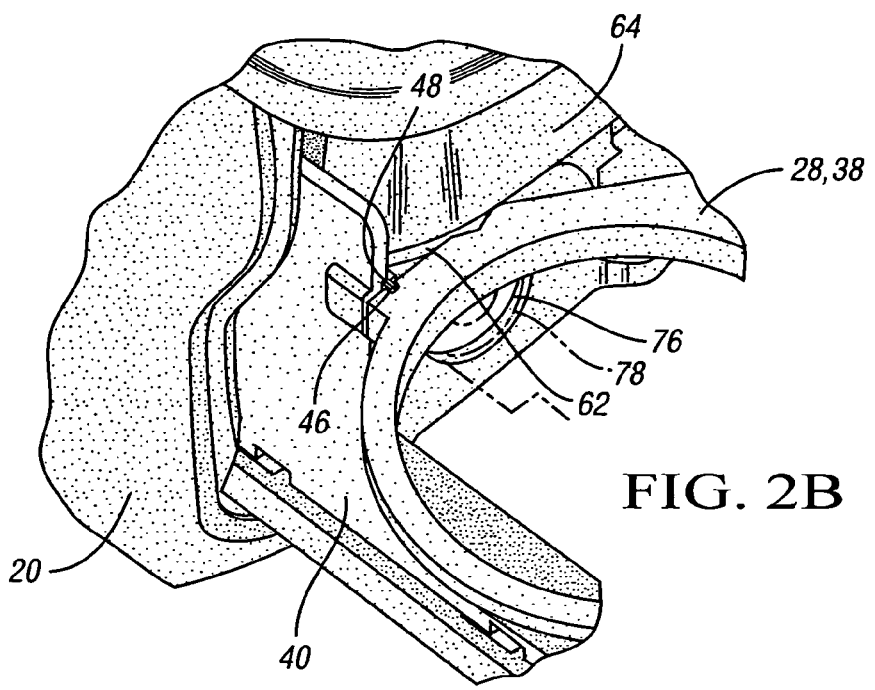
FIG. 2B is a schematic perspective illustration in partially rotated fragmentary view of the cup holder assembly of FIG. 1 showing a locking element locking one of the support rings into the use position.

Referring to FIG. 2B, when the first ring 28 is locked or stopped in the use position 38 by the first locking or locating element 46, the first ring 28 rests against a cam surface 62 formed by a rearwardly-facing wall 64 of the housing 14. The cam surface 62 may be better viewed in FIG. 2A. The spring 52 shown adjacent to the second support ring 30 in FIG. 1 and a like spring disposed adjacent to first support ring 28 (not shown) are combination torsion and compression springs which function to bias the support rings 28, 30 in the use position 38 and against the locking or stop elements 46, 50.

Referring to FIG. 2A, when force is applied to the cover 44 (manually, by a rear seat passenger) to move the cover 44 and the slideable rails 40, 42 toward the housing 14 (rail 42 being partially hidden in FIG. 2A), the biasing forces of the springs are overcome. The force supplied to the cover 44 first causes the support rings 28, 30 to be pushed slightly backward compressing the springs toward the cover 44 until the locking element 46 on the rail 40 and the notch 48 on the ring 28 move apart sufficiently to disengage the locking element 46 from the notch 48, (locking element 50 also disengaging from its respective notch). Then while the cover is being pushed, the first and second support rings 28, 30 are biased against the cam surface 62. Once unlocked from the locking elements 46, 50, further pushing the cover 44 towards the housing 14 causes the support rings 28, 30 to follow the bias of the cam surface 62, sufficiently to cause the support rings 28, 30 to pivot as shown in FIG. 2A.

As may be viewed in FIG. 2A, the side walls 20, 22 are spaced from the rearwardly-facing wall 64 to form a left crevice 66 between the left side wall 20 and the rearwardly-facing wall 64 and a like right crevice 68 between the right side wall 22 and the rearwardly-facing wall 64. The recess 26 of the storage bin 24 further defines the crevices 66, 68. As the cover 44 is moved toward the housing 14, the first rail slides in the left crevice 66 and the second rail 42 slides in the right crevice 68.

Referring now to FIG. 3, when the cover 44 has completed movement toward the housing 14, the cover 44 cooperates with the side walls 20, 22 to further enclose the interior space 16. (Note that in FIG. 3 the storage bin 24 of FIG. 1 is removed to provide a view of the interior of the housing 14.) FIG. 3 shows openings 70 formed in the housing 14 to receive extension tabs (not shown) formed on the storage bin 24 for connecting the storage bin 24 to the housing 14. (Note, however, that the storage bin 24 may also be integrally formed with the housing 14.)

When the cover 44 is moved completely toward the housing 14, the support rings 28, 30 have completed a path following the cam surface 62 such that they are pivoted to a stored position 72 in which the support rings 28, 30 are substantially inside of the interior space 16 and are disposed parallel to the adjacent side walls 20, 22. (Note that FIG. 3 shows only the support ring 28 in the stored position 72. However, the support ring 30 is disposed in a mirror-like arrangement, accordingly it is not necessary to show the support ring 30 in the stored position 72 in order for one skilled in the art to understand the invention.) In the stored position 72, the first support ring 28 is disposed in the crevice 66 formed between the rearwardly-facing wall 64 and the side wall 20 and is in alignment with the first rail 40. Accordingly, the first support ring 28 has pivoted approximately 90 degrees in traveling between the use position 38 and the stored position 72. The second support ring 30 has likewise pivoted to be disposed in the crevice 68 in alignment with the second rail 42. Although the storage bin 24 is not shown in FIG. 3, it is apparent from the views of FIG. 1 and FIG. 2A that when the support rings 28, 30 are in the stored position 72, they are disposed between the storage bin 24 and the side walls 20, 22, respectively. In current vehicle consoles, the crevices 66, 68 are generally unused space. Accordingly, the cup holder assembly 10 employs the unused space of the crevices 66, 68 to store the support rings 28, 30 which leaves enough room for the storage bin 24 to recess into the interior space 16.

Referring to FIG. 3, the housing 14 is formed with stabilizing arms 74 which cooperates with the first rail 40 to counterbalance upward movement of the first rail 40 caused by the weight of beverage containers 32, 34 when the first and second support rings 28, 30 are in the use position 38. Like stabilizing arms (not shown) cooperate with the second rail 42.

Referring now to FIG. 2A, the rearwardly-facing wall 64 of the housing 14 is formed with an auxiliary power outlet opening 76 configured to receive an auxiliary power outlet 78 partially shown in phantom in FIG. 2B. Referring again to FIG. 2A, the cover 44 is formed with an annular recess 80 which cooperates with the auxiliary power outlet opening 76 when the cover 44 is moved towards the housing 14 (i.e., is closed) to allow access to the auxiliary power outlet 78 of FIG. 2B from the rearward location 36 in the vehicle 12 (shown in FIG. 1).

Accordingly, the cup holder assembly 10 realizes an efficient packaging arrangement in which a floor console 14 having dimensions similar to those currently used may house a parking brake mechanism 18, a storage bin 24 receding between side walls 20, 22 of the housing 14, two cup holder rings which are stored within the interior space 16 when in a stored position and also offers an auxiliary power outlet 78. These features are provided without extending the length of the console 14 so as not to compromise rear floor space. The cup holder assembly may also be used on a more forward portion of the console for use by front seat passengers.

While the best mode for carrying out the invention has been described in detail, those familiar with the art to which this invention relates will recognize various alternative designs and embodiments for practicing the invention within the scope of the appended claims.

The invention claimed is:

1. A cup holder assembly comprising:
a housing at least partially defined by a pair of opposing side walls and configured to at least partially enclose an interior space, said housing including a cam surface;
at least one support ring pivotably movable between a use position, in which said support ring is substantially outside of said interior space substantially perpendicular to said opposing side walls and operable for at least partially supporting a container, and a stored position in which said support ring is substantially inside of said interior space substantially parallel to and substantially adjacent to one of said walls, said at least one support ring contactable with said cam surface sufficiently to cause said at least one support ring to pivot between said positions;
at least one rail slideably connected with respect to said housing and configured to cooperate with said at least one support ring to further support said container;
a cover connected to said at least one rail and configured to cooperate with said opposing side walls to further enclose said interior space;
said at least one support ring being pivotably connected between said at least one rail and said cover; said cover being movable toward and away from said housing for moving said at least one support ring between said stored position and said use position, respectively;
a locking element operable for locking said at least one support ring in said use position when said cover is moved away from said housing and unlocking said at least one support ring as said cover is moved toward said housing to permit pivoting of said at least one support ring to said support position; and
a spring connected between said cover and said at least one support ring, said spring being operable for biasing said at least one support ring toward said use position and toward said locking element.

2. The cup holder assembly of claim 1, wherein said at least one support ring includes a first support ring and a second support ring, said first support ring being substantially adjacent to the other of said side walls when said rings are in said stored position; and further comprising:
a storage bin further defining said interior space and recessed between said first and second support rings when said support rings are in said stored position such that said first and second support rings are stored between said bin and said respective side walls.

3. The cup holder assembly of claim 1, wherein said housing is a floor console for a vehicle, said cover being movable rearward of said console to provide accessibility to said at least one support ring from a rearward location in said vehicle.

4. A cup holder assembly comprising:
a housing characterized by outer side walls spaced apart from one another, said housing having a cam surface;
a cover movable toward and away from said housing;
two rails connected with respect to said cover and each slideable as said cover is moved toward and away from said housing; and
two pivotable substantially circumferential support elements connected between said cover and said rails and each automatically pivotable along said cam surface as said cover is moved toward said housing between a use position, in which each of said pivotable substantially circumferential support elements is operable for at least partially supporting a respective container, and a stored position, in which each of said substantially circumferential support elements is disposed within said housing along opposing sides of an upwardly open storage bin, and vice versa as said cover is moved away from said housing.

5. The cup holder assembly of claim 4, further comprising:
locking elements locking said substantially circumferential support elements in said use position when said cover is moved away from said housing and unlocking said circumferential support elements as said cover is moved toward said housing to permit pivoting of said substantially circumferential support elements to said stored position.

6. The cup holder assembly of claim 5, further comprising:
springs connected between said cover and said substantially circumferential support elements and biasing said circumferential support elements toward said use position and toward said locking elements.

7. The cup holder assembly of claim 4, wherein said housing is configured to receive a power outlet, said cover being cooperatively configured to permit access to said power outlet from a rearward location in said vehicle.

8. The cup holder assembly of claim 4, wherein said rails cooperate with said substantially circumferential support elements for further supporting the respective containers.

9. The cup holder assembly of claim 4, wherein said housing is a floor console for a vehicle, said cover being movable rearward of said console to provide access to said substantially circumferential support elements from a rearward location in said vehicle.

10. The cup holder assembly of claim 4, wherein said console defines a cavity adapted for at least partially containing a parking brake mechanism.

11. A cup holder assembly comprising:
   a housing defined by a plurality of walls spaced apart from one another to define an interior space and forming a cam surface;
   a pair of spaced rails slideably mounted at opposing ones of said walls and slideable with respect to said housing;
   a cover connected to said rails and movable toward and away from said housing via said slideable rails; and
   a pair of pivotable support rings connected between said rails and said cover and automatically pivoting and rotating approximately 90 degrees along said cam surface between a use position, in which each of said support rings is operable for at least partially supporting a container, and a stored position, in which said support rings are disposed in substantial vertical alignment with said rails along said opposing walls, as said cover is moved toward said housing and vice versa as said cover is moved away from said housing.

12. The cup holder assembly of claim 11, wherein said cover is configured to receive a power outlet between said pair of rails, said cover being cooperatively configured to permit access to said power outlet.

13. The cup holder assembly of claim 11, wherein a portion of said housing forms a storage bin receding between said opposing ones of said walls, said pair of support rings being located between said storage bin and said opposing ones of side walls when said support rings are in said stored position.

14. The cup holder assembly of claim 11, wherein said housing is a floor console for a vehicle, said cover being movable rearward of said console to provide access to said support rings from a rearward location in said vehicle.

15. The cup holder assembly of claim 11, wherein each of said spaced rails is operable for cooperating with a respective one of said pair of support rings for further supporting said container.

* * * * *